US008594570B2

(12) United States Patent
Yan et al.

(10) Patent No.: US 8,594,570 B2
(45) Date of Patent: Nov. 26, 2013

(54) TELECOMMUNICATION INTELLIGENT CARD AND METHOD FOR SIGNALING INTERACTION WITH EXTERNAL NON-CONTACT CARD

(75) Inventors: Guangwen Yan, Beijing (CN); Lili Liu, Beijing (CN)

(73) Assignee: Beijing Watch Data System Co., Ltd. (CN)

( * ) Notice: Subject to any disclaimer, the term of this patent is extended or adjusted under 35 U.S.C. 154(b) by 531 days.

(21) Appl. No.: 12/865,676

(22) PCT Filed: Jan. 14, 2009

(86) PCT No.: PCT/CN2009/070139
§ 371 (c)(1),
(2), (4) Date: Jul. 30, 2010

(87) PCT Pub. No.: WO2009/097770
PCT Pub. Date: Aug. 13, 2009

(65) Prior Publication Data
US 2010/0330911 A1    Dec. 30, 2010

(30) Foreign Application Priority Data

Feb. 1, 2008  (CN) .......................... 2008 1 0057432

(51) Int. Cl.
*H04B 7/00* (2006.01)
(52) U.S. Cl.
USPC ........ 455/41.2; 455/558; 455/550.1; 235/492
(58) Field of Classification Search
USPC .............. 455/41.2, 558, 550.1, 466; 235/492, 235/380, 486
See application file for complete search history.

(56) References Cited

U.S. PATENT DOCUMENTS

| | | | | |
|---|---|---|---|---|
| 5,548,814 | A * | 8/1996 | Lorang et al. | 370/310 |
| 6,343,945 | B1 * | 2/2002 | Liikanen | 439/160 |
| 6,381,452 | B1 * | 4/2002 | Tien et al. | 455/344 |
| 7,188,089 | B2 * | 3/2007 | Goldthwaite et al. | 705/67 |
| 7,336,973 | B2 * | 2/2008 | Goldthwaite et al. | 455/558 |
| 7,581,159 | B2 * | 8/2009 | Hocevar | 714/790 |
| 2004/0087339 | A1 * | 5/2004 | Goldthwaite et al. | 455/558 |

(Continued)

FOREIGN PATENT DOCUMENTS

| | | |
|---|---|---|
| CN | 1773528 A | 5/2006 |
| CN | 1933351 A | 3/2007 |

(Continued)

OTHER PUBLICATIONS

English translation of the International Preliminary Report on Patentability Chapter I dated Aug. 3, 2010.

(Continued)

*Primary Examiner* — Minh D Dao
(74) *Attorney, Agent, or Firm* — Amster, Rothstein & Ebenstein LLP (57) ABSTRACT

A telecommunication intelligent card and a method for signaling interaction between a telecommunication intelligent card and an external non-contact card. The telecommunication intelligent card includes: a control unit for controlling a transmission unit to perform interactive communication with an external non-contact card, and processing signaling data from the transmission unit; and a transmission unit for interactive communication with the external non-contact card, and transmitting the signaling data received from the external non-contact card to the control unit.

17 Claims, 3 Drawing Sheets

(56) References Cited

U.S. PATENT DOCUMENTS

| | | | |
|---|---|---|---|
| 2004/0127256 A1* | 7/2004 | Goldthwaite et al. | 455/558 |
| 2004/0230489 A1* | 11/2004 | Goldthwaite et al. | 705/26 |
| 2006/0009692 A1* | 1/2006 | Fukuda et al. | 600/407 |
| 2007/0253251 A1 | 11/2007 | Mizushima et al. | |
| 2008/0076475 A1* | 3/2008 | Kim | 455/558 |
| 2012/0072350 A1* | 3/2012 | Goldthwaite et al. | 705/44 |

FOREIGN PATENT DOCUMENTS

| | | |
|---|---|---|
| CN | 101064893 A | 10/2007 |
| CN | 101257683 A | 9/2008 |
| WO | 2006050646 A1 | 5/2006 |

OTHER PUBLICATIONS

English translation of the Written Opinion of the International Searching Authority dated Apr. 23, 2009.

English translation of the International Search Report of the International Searching Authority dated Apr. 23, 2009.

* cited by examiner

Fig.3

TELECOMMUNICATION INTELLIGENT CARD AND METHOD FOR SIGNALING INTERACTION WITH EXTERNAL NON-CONTACT CARD

CROSS REFERENCE TO RELATED APPLICATIONS

This application is a U.S. national stage entry under 35 U.S.C. §371 of PCT International Application No. PCT/CN2009/070139, filed on Jan. 24, 2009, and claims priority to Chinese Patent Application No. 200810057432.0, filed on Feb. 1, 2008, the contents of which are incorporated herein by reference in their entirety.

FIELD OF THE INVENTION

The present invention relates to the field of mobile communication apparatus, and particularly to a telecommunication intelligent card and a method for signaling interaction with an external non-contact card.

BACKGROUND OF THE INVENTION

At present, a telecommunication intelligent card of a mobile phone such as an SIM card, a UIM card, a USIM card, etc. can implement basic telecommunication functions, such as accessing a communication network, user authentication and etc.

Along with the increase of services and the continuous increase of user demands, it needs to implement interactive communication with an external non-contact card by using a mobile phone, such as deducting money from an electronic purse intelligent card, etc.

In the process of implementing the present invention, the inventor found there exists at least the following technical problem in the prior art:

The existing telecommunication intelligent card of a mobile phone has not had a function of interactive communication with an external non-contact card.

SUMMARY OF THE INVENTION

An embodiment of the present invention provides a telecommunication intelligent card and a method of for signaling interaction with an external non-contact card, in order to solve the problem that, in the prior art, a telecommunication intelligent card of a mobile phone can not conduct interactive communication with an external non-contact card.

An embodiment of the present invention provides a telecommunication intelligent card, comprising:

a control unit for controlling a transmission unit to perform interactive communication with an external non-contact card, and processing signaling data from the transmission unit; and the transmission unit for performing interactive communication with the external non-contact card, and transmitting the signaling data received from the external non-contact card to the control unit.

An embodiment of the present invention provides a method for signaling interaction between a telecommunication intelligent card and an external non-contact card, comprising the steps of:

Sending, by the telecommunication intelligent card, operation signaling to the external non-contact card; and receiving signaling data returned from the external non-contact card, and processing the signaling data.

By adding a control unit and a transmission unit in the existing telecommunication intelligent card, the telecommunication intelligent card provided by the embodiment of the present invention implements a function of signaling interaction between the telecommunication intelligent card and the external non-contact card, i.e., implements a function that the telecommunication intelligent card reads/writes a reader of the external non-contact card, meeting a demand that a user accesses an external non-contact card by using a mobile phone, and enhancing the user's use experience.

DETAILED DESCRIPTIONS OF THE EMBODIMENTS

In order to implement interactive communication between a telecommunication intelligent card of a mobile phone and an external non-contact card, an embodiment of the present invention provides a telecommunication intelligent card, which implements a function of conducting interactive communication with the external non-contact card and being able to perform corresponding processing on signaling data transmitted from the external non-contact card, based on the existing telecommunication intelligent card.

Figure 1:
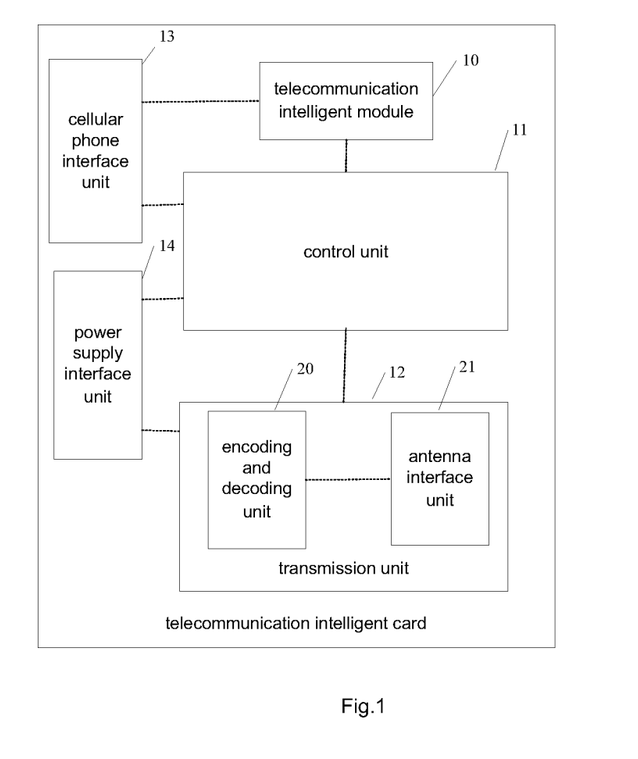
FIG. 1 is a schematic diagram of the structure of a telecommunication intelligent card according to an embodiment of the present invention.

Referring to FIG. 1, a telecommunication intelligent card according to the embodiment of the present invention comprises an existing telecommunication intelligent module 10, and further comprises a control unit 11 and a transmission unit 12, wherein:

the control unit 11 is connected to the transmission unit and is used for controlling the transmission unit to perform interactive communication with an external non-contact card, and processing signaling data from the transmission unit; and the transmission unit 12 is used for performing interactive communication with the external non-contact card, and transmitting the signaling data received from the external non-contact card to the control unit.

Specifically, the control unit 11 is used for transmitting operation signaling for the external non-contact card to the transmission unit, receiving signaling data transmitted from the transmission unit and processing the signaling data. Here, the operation signaling transmitted by the control unit to the transmission unit can come from the application software of mobile phones or come from a telecommunication intelligent module or be signaling generated by the control unit itself, etc. The operation signaling comprises, but is not limited to, a data read command, a data write command, a reset command, etc.

The transmission unit 12 comprises a encoding and decoding unit 20 and an antenna interface unit 21, wherein the encoding and decoding unit 20 is connected with the antenna interface unit and is used for encoding signaling transmitted to the external non-contact card, transmitting the encoded signaling data to the antenna interface unit, decoding the signaling received from the antenna interface unit, and transmitting the decoded signaling data to the control unit; and the antenna interface unit 21 is used for connecting the encoding and decoding unit with an external antenna, i.e., the encoding and decoding unit is connected with the antenna interface unit and the external antenna is connected with the antenna interface unit simultaneously; and, the antenna interface unit transmits the signaling data encoded by the encoding and decoding unit to the external antenna and thus to the external non-contact card, and transmits the signaling data received from the external antenna to the encoding and decoding unit.

Here, specifically, the antenna interface unit can be existing output contacts of the telecommunication intelligent card; the output contacts connect the telecommunication intelligent module with the external antenna, i.e., the telecommunication intelligent module and the external antenna are both connected with the antenna interface unit; and, the existing output contacts comprises a contact C4 and a contact C8, i.e., the encoding and decoding unit is connected with the external antenna via the contact C4 and the contact C8.

The external antenna transmits signaling data transmitted by the antenna interface unit to the external non-contact card, and transmits signaling received from the external non-contact card to the antenna interface unit.

In order to be able to interact with a mobile phone, the telecommunication intelligent card according to the embodiment of the present invention further comprises a cellular phone interface unit 13; and the cellular phone interface unit is connected with the control unit and is used for receiving operation signaling from the mobile telephone, and transmitting the operation signaling to the control unit which transmits the operation signaling to the transmission unit.

Here, specifically, the cellular phone interface unit can be existing contacts of the telecommunication intelligent card for receiving an input signal of mobile phone software and transmitting a signal to the mobile phone software, and the existing contacts comprise a reset signal contact C2, a clock signal contact C3 and an input and output contact C7.

Here, the control unit can be connected with the cellular phone interface unit directly. Preferably, in order that on/off of connection between the control unit and the cellular phone interface unit is controllable, a circuit control unit can be added further for receiving a command for establishing or disconnecting connection between the control unit and the cellular phone interface unit, and establishing or disconnecting connection between the control unit and the cellular phone interface unit according to the command. Specifically, the circuit control unit can use a universal transistor switch control circuit. Specifically, the control unit can be a master control single chip microcomputer.

After having received signaling data returned from the external non-contact card, the external antenna transmits the signaling data to the encoding and decoding unit via the antenna interface unit. The encoding and decoding unit transmits the signaling data directly to the control unit to be processed, or the encoding and decoding unit transmits the signaling data to a circuit of the cellular phone interface unit, and the mobile phone software reads data on the circuit of the cellular phone interface unit. Thus, the encoding and decoding unit is further connected with the mobile interfacing unit.

The present device further comprises:

a power supply interface unit 14 connected with the control unit and the transmission unit for supplying power to the control unit and the transmission unit.

Here, specifically, the power supply interface unit can be existing power supply contacts of the telecommunication intelligent card. The existing power supply contacts comprise a power source input contact C1, a power source ground contact C5 and a control contact C6. The control unit and the transmission unit can be connected with the power supply interface unit directly. Preferably, in order that on/off of connection between the control unit, the transmission unit and the power supply interface unit is controllable, a power source control unit can be added further for receiving a command for establishing or disconnecting connection between the control unit, the transmission unit and the power supply contacts, and establishing or disconnecting connection between the control unit, the transmission unit and the power supply interface unit according to the command. Specifically, the power supply interface unit can adopt a universal transistor switch control circuit.

The existing telecommunication intelligent module 10 of the telecommunication intelligent card is connected with the cellular phone interface unit and the antenna interface unit, for storing related information of a user of the mobile phone, and completing the communication function of the existing telecommunication intelligent card. The existing telecommunication intelligent module 10 of the telecommunication intelligent card can also be connected with the external antenna and supports non-contact communication, and thus, accesses from the outside can be further accepted via the external antenna, allowing the telecommunication intelligent card to have the function of a non-contact telecommunication intelligent card.

Preferably, the control unit is connected with the telecommunication intelligent module, and makes command interaction with the control unit. For example, the control unit can access verification information or a verification algorithm in the telecommunication intelligent module, and authenticate the external non-contact card and the telecommunication intelligent card.

The control unit is connected with the cellular phone interface unit, and the connection line thereof can be independent of the connection line between the existing telecommunication intelligent module and the cellular phone interface unit. Preferably, the control unit multiplexes the connection line between the telecommunication intelligent module and the cellular phone interface unit, i.e., the control unit and the telecommunication intelligent module are connected with the cellular phone interface unit by way of bus multiplexing.

Figure 2:
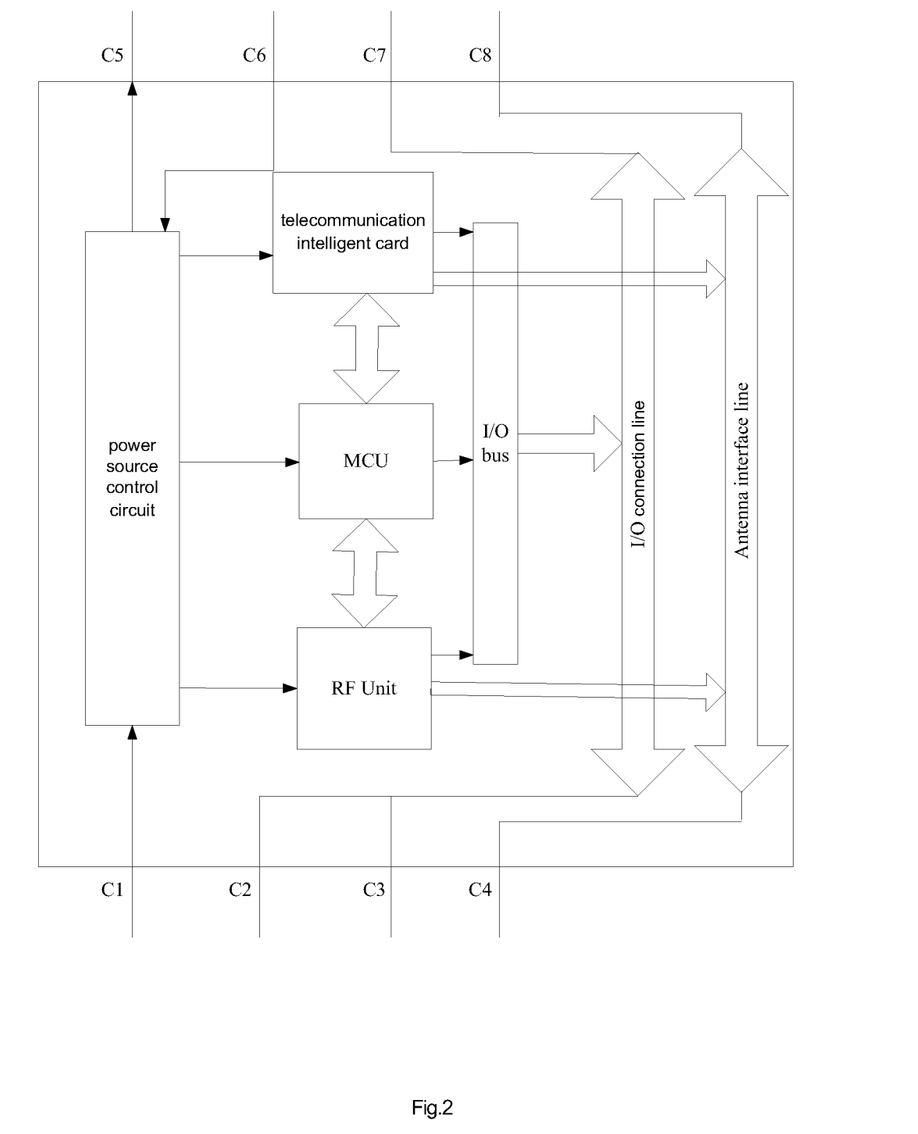
FIG. 2 is a specific exemplary diagram of the telecommunication intelligent card according to the embodiment of the present invention.

As shown in FIG. 2, a detailed schematic diagram of a telecommunication intelligent card according to an embodiment of the present invention is shown, in which the control unit (MCU) is connected with the encoding and decoding (RF) unit. By multiplexing an I/O connection line between the existing telecommunication intelligent module and input/output (I/O) contacts, the MCU and the RF unit are connected with the I/O contacts comprising contacts C2, C3 and C7. The MCU and the RF unit are connected with power supply contacts C1, C5 and C6 via a power source control circuit. The external antenna is connected with output contacts C4 and C8. The RF unit is connected with the external antenna via contacts C4 and C8. The MCU is further connected with the existing telecommunication intelligent module and can communicate with the telecommunication intelligent module. The telecommunication intelligent module is also connected with contacts C4 and C8, and thus can communicate by using an antenna, forming a non-contact channel.

It is to be pointed out that, the above mentioned various contacts are not unchanged. The existing contacts can be extended or redefined. For example, the contact C1 can be changed from the original power supply contact into an input contact. Alternatively, contacts C9 and C10 are added, the antenna is changed to be connected with contacts C9 and C10, and then the RF module also needs to be changed to be connected with contacts C9 and C10.

The work flow of the telecommunication intelligent card according to the embodiment of the present invention will be described below by using specific example.

Example 1

In this example, the telecommunication intelligent card transmits a reset command to the external non-contact card, which resets and returns a reset success response to the telecommunication intelligent card based on the reset command as follows specifically:

Step S00: mobile phone application software triggers the telecommunication intelligent card to power up the MCU and the RF unit;

Specifically, the mobile phone application software sends an enable level to the contact C6 of the telecommunication intelligent card, and a power source control module, after being enabled, powers up the MCU and the RF unit.

Step S01: the mobile phone application software triggers the MCU on the telecommunication intelligent card to send a reset command to the external non-contact card.

Specifically, after a necessary period of power on delay, the mobile phone application software sends a reset command to the contacts C2, C3 and C7 of the telecommunication intelligent card, and the contacts C2, C3 and C7 send the reset command to the MCU.

The MCU sends the reset command to the RF unit, which encodes the reset command and transmits an RF modulation wave of the reset command to the external non-contact card via an antenna.

Preferably, when sending the reset command to the contacts C2, C3 and C7, since both the telecommunication intelligent module and the MCU are connected with the contacts C2, C3 and C7, both the MCU and the telecommunication intelligent module may receive the reset command. In order to distinguish from the command of the telecommunication intelligent module, a node address byte (NAD) in a "block frame" defined normally is used here to distinguish from the object to which the command is provided. The NAD in a command frame that is sent to the MCU is set as a numerical value distinguishable from the NAD in the command frame provided to the telecommunication intelligent module. For example, the NAD of a command frame provided to the telecommunication intelligent module is set as 0, and the NAD of a command frame provided to the telecommunication intelligent module is set as 1. Thus, when a command appears on the lines of contacts C2, C3 and C7, the telecommunication intelligent module and the MCU receive the command simultaneously. It can be determined by using the NAD identification whether the command is valid for themselves. If it is an invalid command, then it will not be processed, and if it is a valid command, then a subsequent corresponding process will be performed. And when reply signaling is received, a command frame having a corresponding NAD is send back onto the lines of contacts C2, C3 and C7, and the mobile phone software reads reply information from the lines and performs a subsequent operation.

Step S02: the external non-contact card, after resetting according to the reset command, returns reset reply signaling to the telecommunication intelligent card.

Specifically, the external non-contact card located in the RF field of an antenna obtains electric energy through the electromagnetic induction principle, and, after being powered up, sends a reset reply sub-carrier to the telecommunication intelligent card.

Step S03: the antenna of the telecommunication intelligent card transmits the received reset reply signaling returned from the external non-contact card to the RF unit, which decodes the reset reply signaling and sends the decoded reset reply signaling onto the lines of the contacts C2, C3 and C7.

In this step, after decoding the received rest reply signaling, the RF unit may further transmits the decoded signaling data to the MCU, which organizes the signaling data into data of a prescribed frame structure and then sends the data onto the lines of the contacts C2, C3 and C7.

Step S04: the mobile phone application software parses the data read from the lines of the contacts C2, C3 and C7 to obtain reset reply data, and performs corresponding operations such as screen display or voice prompt, etc.

Example 2

In this example, the telecommunication intelligent card sends a data read command to the external non-contact card which returns data needed to read to the telecommunication intelligent card according to the data read command as follows specifically:

Step S10: the mobile phone application software sends a data read command to the contacts C2, C3 and C7 of the telecommunication intelligent card.

Step S11: the contacts C2, C3 and C7 send the data read command to the MCU.

Step S12: the MCU sends the data read command to the RF unit.

Step S13: the RF unit encodes the data read command and then transmits it to the external non-contact card via the antenna.

Step S14: after receiving the data read command, the external non-contact card queries data needed to read by the telecommunication intelligent card according to related information in the data read command, and returns the queried data carried in read reply signaling to the telecommunication intelligent card.

Step S15: the antenna of the telecommunication intelligent card transmits the received read reply signaling returned from the external non-contact card to the RF unit which decodes the read reply signaling and transmits the decoded signaling data onto the lines of the contacts C2, C3 and C7.

In this step, after decoding the received read reply signaling, the RF unit may further transmits the decoded signaling data to the MCU, which organizes the signaling data into data of a prescribed frame structure and then sends the data onto the lines of the contacts C2, C3 and C7.

Step S16: the mobile phone application software parses the data read from the lines of the contacts C2, C3 and C7 to obtain data needed to read, and performs operations such as corresponding screen display or voice prompt, etc.

Of course, before step S10, if the MCU and the RF unit of the telecommunication intelligent card have not been powered up, the power up operation identical to that of step S00 needs to be performed.

Example 3

In this example, an operation that the telecommunication intelligent card deducts money from an external electronic purse consumer card is implemented, where the MCU of the telecommunication intelligent card needs to perform signaling interaction with both the external electronic purse consumer card and the internal telecommunication intelligent card, as follows specifically:

Step S20: the mobile phone application software sends a money deducting command to the contacts C2, C3 and C7 of the telecommunication intelligent card.

Step S21: the contacts C2, C3 and C7 send the money deducting command to the MCU.

Step S22: the MCU sends the money deducting command to the RF unit.

Step S23: the RF unit sends the money deducting command to the external electronic purse consumer card via the antenna.

Step S24: the external electronic purse consumer card sends an authentication request containing authentication related information to the telecommunication intelligent card.

Step S25: the antenna of the telecommunication intelligent card transmits the received authentication request returned from the external non-contact card to the RF unit, which decodes the authentication request and transmits the decoded data to the MCU.

Step S26: the MCU organizes the data of the authentication request received from the RF unit into data of a prescribed frame structure and sends the data onto the lines of the contacts C3, C5 and C7; the telecommunication intelligent card reads the data of the authentication request from the lines of the contacts C3, C5 and C7, and authenticates the external electronic purse consumer card according to authentication related information contained in the data of the authentication request or verification information stored by itself or an verification algorithm, and sends the authentication result to the MCU, which sends the authentication result to the RF unit.

Step S27: the RF unit transmits the authentication result to the external electronic purse consumer card via the antenna.

Step S28: the external electronic purse consumer card returns authorization reply signaling or refusing signaling to the telecommunication intelligent card according to the authentication result.

Step S29: the antenna of the telecommunication intelligent card transmits the received authorization reply signaling or refusing signaling returned from the external non-contact card to the RF unit, which decodes the authorization reply signaling or refusing signaling and transmits the decoded data to the MCU.

Step S30: if the MCU receives the authorization reply signaling from the RF unit, then the MCU sends to the RF unit a money deducting command carrying an authentication pass ID; the RF unit transmits the money deducting command to the external electronic purse consumer card via the antenna; the external electronic purse consumer card performs a money deducting operation based on the received money deducting command and then transmits money deducting reply signaling to the telecommunication intelligent card; the antenna of the telecommunication intelligent card transmits the received money deducting reply signaling to the RF unit which decodes the money deducting reply signaling and transmits the decoded data to the MCU which organizes the data into data of a prescribed frame structure and then sends the organized data onto the lines of the contacts C2, C3 and C7. The mobile phone application software parses the data read from the lines of the contacts C2, C3 and C7 to obtain money deducting reply data, and performs operations such as corresponding screen display or voice prompt, etc.

If the MCU receives the refusing signaling from the RF unit, then the money deducting flow this time ends, or the authentication and money deducting operations are performed again.

In the above step S25 and step S29, the RF unit can also transmits the decoded data onto the lines of the contacts C2, C3 and C7 directly; the mobile phone software reads the data from the lines of the contacts C2, C3 and C7, organizes the data into data of a prescribed frame structure and then sends the organized data onto the lines of the contacts C2, C3 and C7; and, the MCU reads the data from the lines of the contacts C2, C3 and C7 to perform subsequent operations. By adopting the scheme, a new communication protocol is needed between the mobile phone and the RF unit, and the protocol can use an existing normal protocol or be redefined.

It is to be pointed out that, the telecommunication intelligent card mentioned in the present invention comprises, but is not limited to: an SIM card for the GSM network, a UIM card for the CDMA network, or a USIM card for the 3G network. The external non-contact card mentioned in the present invention comprises, but is not limited to an electronic card such as an electronic purse consumer card, etc.

Figure 3:
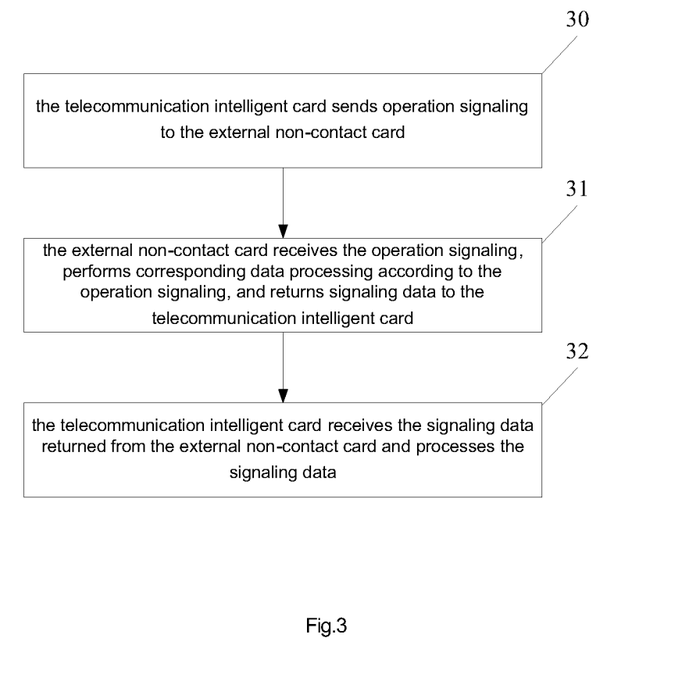
FIG. 3 is a schematic flow chart of a method according to an embodiment of the present invention.

Referring to FIG. 3, based on the above mentioned telecommunication intelligent card of the mobile phone, the embodiment of the present invention further provides a method for signaling interaction between a telecommunication intelligent card of a mobile phone and an external non-contact card, comprising the following steps:

Step 30: the telecommunication intelligent card sends operation signaling to the external non-contact card.

In this step, specifically, the telecommunication intelligent card of the mobile phone sends operation signaling to the external non-contact card via an MCU, an RF unit and an antenna.

The telecommunication intelligent card sends corresponding operation signaling to the external non-contact card according to an external instruction or an internal program flow.

The operation signaling comes from mobile phone application software or an existing telecommunication intelligent card, etc. The operation signaling can adopt a data format of a normal communication protocol, such as protocol ISO7816. Alternatively, the operation signaling can further adopts a self-defined data format. The operation signaling can comprise ID information indicating the operation signaling is valid for a control unit or a telecommunication intelligent module. The operation signaling specifically comprises, but is not limited to, a data read command, a data write command, a setting command and etc.

Before the operation signaling is sent to the external non-contact card, the operation signaling can further be encoded.

Step 31: the external non-contact card receives the operation signaling, performs corresponding data processing according to the operation signaling, and returns signaling data to the telecommunication intelligent card.

Step 32: the signaling data returned from the external non-contact card is received, and the signaling data is processed.

In this step, specifically, an antenna connected with the telecommunication intelligent card transmits the received signaling data returned from the external non-contact card to the RF unit of the telecommunication intelligent card; the RF unit transmits the signaling data directly to the MCU for corresponding processing; or, the RF unit transmits the signaling data onto lines of I/O contacts, and the mobile phone software reads signaling data from the lines of the I/O contacts, and perform corresponding processing.

The corresponding processing performed on the signaling data by the telecommunication intelligent card comprises, but is not limited to, sending the signaling data to the mobile phone software, which processes the signaling data, such as screen display or voice prompt for the signaling data, etc.; or, by the telecommunication intelligent card, storing the signaling data or updating information in a telecommunication intelligent module according to the signaling data.

Before processing the signaling data, the signaling data can be decoded as required, to obtain identifiable valid data of a prescribed format.

Preferably, before the external non-contact card performs a data operation according to the operation signaling, the external non-contact card can request the telecommunication intelligent card to perform an ID authentication, the telecommunication intelligent module of the telecommunication intelligent card authenticates the external non-contact card and the telecommunication intelligent card according to verification information stored by itself or a verification algorithm. If the authentication passes, then the external non-contact card performs corresponding processing according to the operation signaling, otherwise, returns a refusing reply.

To summarize, the advantage effect of the present invention is as follows:

In the solution according to the embodiment of the present invention, by adding a control unit and a transmission unit in the existing telecommunication intelligent card of a mobile phone, a function of interactive communication between the telecommunication intelligent card of the mobile phone and the external non-contact card is achieved, i.e., a function that the telecommunication intelligent card of the mobile phone reads/writes a reader of the external non-contact card is achieved, meeting a demand that a user accesses an external non-contact card by using a mobile phone, and enhancing the user's use experience.

Meantime, in the present invention, the existing telecommunication intelligent module of the telecommunication intelligent card of the mobile phone is connected with the external antenna, enabling the telecommunication intelligent card of the mobile phone to accept an external access as a non-contact card.

Further, in the present invention, the control unit is also connected with the existing telecommunication intelligent module of the telecommunication intelligent card of the mobile phone, the control unit is a contact reader with respect to the telecommunication intelligent module, and signaling interaction can be performed between the control unit and the telecommunication intelligent module independent of the mobile phone.

Obviously, those skilled in the art can make various modifications and variations to the present invention, without departing from the spirit and scope of the present invention. Thus, if the modifications and variations of the present invention belong to the scope of the claims and the equivalents thereof of the present invention, the present invention intends to also encompass the modifications and variations.

The invention claimed is:

1. A telecommunication intelligent card, characterized in that the telecommunication intelligent card comprises:
   a control unit for controlling a transmission unit to perform interactive communication with an external non-contact card, and processing signaling data from the transmission unit; and
   the transmission unit for performing interactive communication with the external non-contact card, and transmitting the signaling data received from the external non-contact card to the control unit;
   wherein the control unit sends operation signaling for the external non-contact card to the transmission unit, receives signaling data transmitted from the transmission unit and processes the signaling data;
   wherein the telecommunication intelligent card further comprises: a cellular phone interface unit connected with the control unit, for receiving operation signaling from a mobile phone and sending the operation signaling to the control unit;
   wherein the cellular phone interface unit comprises contacts for the telecommunication intelligent card to receive a mobile phone software input signal and send a signal to the mobile phone software.

2. The telecommunication intelligent card of claim 1, wherein the transmission unit comprises:
   an encoding and decoding unit connected with an antenna interface unit, for encoding signaling sent to the external non-contact card, sending the encoded signaling data to the antenna interface unit, decoding the signaling received from the antenna interface unit, and sending the decoded signaling data to the control unit;
   the antenna interface unit for connecting the encoding and decoding unit with an external antenna, sending the encoded signaling data to the external antenna to be transmitted to the external non-contact card, and sending the signaling data received from the external antenna to the encoding and decoding unit.

3. The telecommunication intelligent card of claim 2, wherein a telecommunication intelligent module of the telecommunication intelligent card is connected with the external antenna via the antenna interface unit, for storing related information of a user of a mobile phone, and accepting accesses from the outside via the antenna.

4. The telecommunication intelligent card of claim 3, wherein the telecommunication intelligent module of the telecommunication intelligent card is further connected with the control unit, and signaling interaction is conducted between the telecommunication intelligent module and the control unit.

5. The telecommunication intelligent card of claim 3, wherein the control unit and the telecommunication intelligent module of the telecommunication intelligent card are connected with the cellular phone interface unit by way of bus multiplexing.

6. The telecommunication intelligent card of claim 2, wherein the antenna interface unit comprises output contacts at which the telecommunication intelligent card is connected with the external antenna.

7. The telecommunication intelligent card of claim 6, wherein the output contacts comprise an output contact C4 and an output contact C8.

8. The telecommunication intelligent card of claim 1, wherein the contacts comprises a reset signal contact C2 having an interactive transmission function, a clock signal contact C3 and an I/O contact C7.

9. The telecommunication intelligent card of claim 1, wherein the telecommunication intelligent card further comprises:
   a power supply interface unit for supplying power to the control unit and the transmission unit.

10. The telecommunication intelligent card of claim 9, wherein the power supply interface unit comprises power supply contacts of the telecommunication intelligent card.

11. The telecommunication intelligent card of claim 10, wherein the power supply contacts comprise:
   a power source input contact C1, a power source ground contact C5 and a control contact C6.

12. The telecommunication intelligent card of claim 1, wherein the operation signaling comprises any combination of at least one signaling selected from the following signaling:

a data read command, a data write command and a reset command.

13. A method for signaling interaction between a telecommunication intelligent card and an external non-contact card, characterized in that the method comprises the steps of:
   sending, by the telecommunication intelligent card, operation signaling to the external non-contact card; and
   receiving signaling data returned from the external non-contact card, and processing the signaling data;
   receiving, by the telecommunication intelligent card, operation signaling from mobile phone by contacts for the telecommunication intelligent card to receive a mobile phone software input signal and send a signal to the mobile phone software.

14. The method of claim 13, wherein the telecommunication intelligent card sends corresponding operation signaling to the external non-contact card according to an external instruction or an internal program flow.

15. The method according to claim 13, wherein
   before sending operation signaling to the external non-contact card, the method further comprises the step of encoding the operation signaling; and
   before processing the signaling data, the method further comprises:
   decoding the signaling data.

16. The method according to claim 13, wherein the operation signaling comprises an ID information indicating the operation signaling is valid for the control unit or the telecommunication intelligent card.

17. The method according to claim 13, wherein processing the signaling data comprises:
   sending the signaling data to the mobile phone software, which processes the signaling data; or storing the signaling data or updating information in the telecommunication intelligent module according to the signaling data.

* * * * *